A. CHRISTIAN.
Velocipede.
No. 81,603. Patented Sept. 1, 1868.
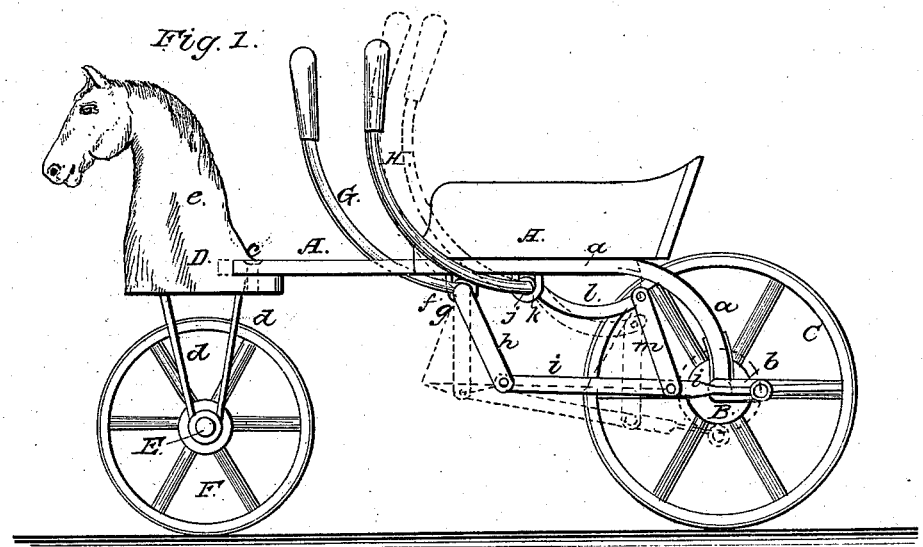
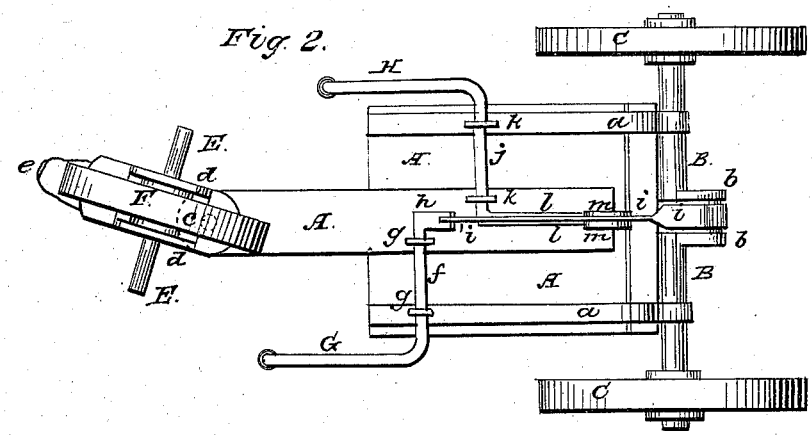
Witnesses.
Wm. A. Morgan
G. C. Cotton
Inventor
A. Christian
per Munn & Co. Atty

United States Patent Office.

ANDREW CHRISTIAN, OF NEW YORK, N. Y.

Letters Patent No. 81,603, dated September 1, 1868.

---

IMPROVEMENT IN VELOCIPEDES.

---

The Schedule referred to in these Letters Patent and making part of the same.

---

TO ALL WHOM IT MAY CONCERN:

Be it known that I, ANDREW CHRISTIAN, of the city, county, and State of New York, have invented a new and improved Velocipede; and I do hereby declare that the following is a full, clear, and exact description thereof, which will enable others skilled in the art to make and use the same, reference being had to the accompanying drawings, forming a part of this specification.

Figure 1 is a side elevation of my improved velocipede.

Figure 2 is an inverted plan view of the same.

Similar letters of reference indicate corresponding parts.

This invention has for its object the construction of a velocipede in such manner that the axle will always be under complete control of the operator, the dead-point being readily and completely overcome.

The invention consists in so connecting the two operating-levers with the connecting-rod of the crank that the dead-point of one will readily be overcome by the movement of the other.

The invention also consists in a new manner of connecting the front or steering-wheel with the body of the vehicle.

A, in the drawing, represents the body of the velocipede. It is made of suitable form and material.

B is the rear axle, having its bearings in sills $a\ a$, or in any other suitable portion of the body A.

C C are the wheels, mounted on the axle B.

$b$ is the crank, formed on the axle.

The front portion of the body A is narrow, and is pivoted upon a backward projection of a block or plate, D, by means of an upright pin, $c$. From the under side of the block or plate D, project downwards braces or arms $d\ d$, which support the front axle E, as shown. On the front axle is hung or mounted a wheel, F, or two wheels, if desired.

By taking hold of a handle, $e$, projecting from the plate D, the whole plate and its appendages, $d$ E F, can be turned to steer the apparatus in any desired direction.

By the afore-described arrangement, the vehicle consists of two separate trucks, one in front, and one in rear, both being connected by means of a pin, $c$, as shown.

G and H are the two handles for turning the rear axle B. They are arranged on the two sides of the body A.

The handle G has a horizontal arm, $f$, which is, by staples $g$, fitted and pivoted to the under side of the platform A.

The horizontal arm $f$ is under the middle of the body A, turned down, as at $h$, to form a vertical arm $h$, the lower end of which is pivoted to the front end of a connecting-rod, $i$, the rear end of which is pivoted to the crank $b$.

The handle H has also a horizontal arm, $j$, fastened by means of staples $k\ k$ to the under side of the body A. At the middle of the body, the arm $k$ is bent back to form a horizontal arm, $l$, which is at right angles to $k$, as in fig. 2.

The end of $l$ is, by means of a rod, $m$, connected with the connecting-rod $i$, near the crank $b$, as shown.

Now it will be observed that, owing to its connection with the rod $i$, the handle G will be unable to operate the axle when $i$ is horizontally in line with the crank $b$, as in fig. 1, as then the handle G has its connection on the dead-point. But just then the handle H has its rod $m$ in such position as to conveniently lower or raise the crank-end of the rod $i$, to thereby get the handle G in working position again.

When, however, the crank is in a vertical position, as by red lines in fig. 1, it will be parallel with the rod $m$, and then the lever H will have no effect upon the motion of the axle, while the handle G will be available.

Thus, although both connected with the same crank, the levers G H can only operate in combination, one relieving the other from the dead-point position.

Having thus described my invention, what I claim as new, and desire to secure by Letters Patent, is—

The operating-device of a velocipede, consisting of the bell-crank levers G H, one having a vertical and the other a horizontal lower end, and of the rods $m\ i$, and crank $b$, all made and operating substantially as herein shown and described.

A. CHRISTIAN.

Witnesses:
FRANK BLOCKLEY,
ALEX. F. ROBERTS.